(12) United States Patent
Larsen

(10) Patent No.: US 7,671,570 B2
(45) Date of Patent: Mar. 2, 2010

(54) SYSTEMS AND METHODS INVOLVING OPERATING VARIABLE SPEED GENERATORS

(75) Inventor: Einar Vaughn Larsen, Charlton, NY (US)

(73) Assignee: General Electric Company, Schenectady, NY (US)

( * ) Notice: Subject to any disclaimer, the term of this patent is extended or adjusted under 35 U.S.C. 154(b) by 40 days.

(21) Appl. No.: 12/098,071

(22) Filed: Apr. 4, 2008

(65) Prior Publication Data
US 2009/0250943 A1 Oct. 8, 2009

(51) Int. Cl.
*H02P 11/00* (2006.01)
*H02P 9/00* (2006.01)

(52) U.S. Cl. .......................... 322/29; 322/44

(58) Field of Classification Search ............ 322/29, 322/24, 28, 44, 59, 89; 363/170, 174; 323/348; 307/85
See application file for complete search history.

(56) References Cited

U.S. PATENT DOCUMENTS

| | | | | |
|---|---|---|---|---|
| 3,343,001 A | * | 9/1967 | Grimsdale et al. | 307/87 |
| 4,400,659 A | * | 8/1983 | Barron et al. | 322/32 |
| 4,906,060 A | * | 3/1990 | Claude | 322/29 |
| 6,054,776 A | * | 4/2000 | Sumi | 290/17 |
| 6,348,743 B1 | * | 2/2002 | Sakasai et al. | 290/40 B |
| 6,486,640 B2 | | 11/2002 | Adams | |
| 7,119,452 B2 | * | 10/2006 | Larsen | 290/55 |
| 7,309,930 B2 | * | 12/2007 | Suryanarayanan et al. | 290/55 |
| 7,466,109 B1 | * | 12/2008 | Larsen et al. | 322/59 |
| 2007/0069522 A1 | * | 3/2007 | Barton et al. | 290/44 |
| 2007/0085343 A1 | | 4/2007 | Fortmann | |
| 2007/0164567 A1 | * | 7/2007 | Luetze et al. | 290/44 |
| 2008/0277938 A1 | * | 11/2008 | Oohara et al. | 290/44 |
| 2009/0066089 A1 | * | 3/2009 | Arinaga et al. | 290/55 |

FOREIGN PATENT DOCUMENTS

EP 0858153 A1 8/1998
WO WO 2007/099936 A1 * 9/2007

OTHER PUBLICATIONS

UK Search Report, Date of Mailing: Jul. 21, 2009, GB Application No. GB0905605.2.

* cited by examiner

*Primary Examiner*—Julio Gonzalez
(74) *Attorney, Agent, or Firm*—Cantor Colburn LLP

(57) ABSTRACT

A method for operating an asynchronous generator comprising receiving an indication that a power grid frequency is reduced. Responsive to the receiving the indication, reducing a speed of the asynchronous generator from a first speed to a second speed for a first time period, wherein the reduction of the speed of the asynchronous generator results in a momentary increase in a total power output of the asynchronous generator. Increasing the speed of the asynchronous generator from the second speed to a third speed responsive to the end of the first time period.

18 Claims, 3 Drawing Sheets

SYSTEMS AND METHODS INVOLVING OPERATING VARIABLE SPEED GENERATORS

BACKGROUND OF THE INVENTION

Embodiments of the invention relate generally to electrical power generators, and more particularly to running variable speed electrical power generators on a power grid.

In this regard, power grids operate near a set frequency, for example, 50 hz or 60 hz. The generators that produce the power often operate at a speed that is locked to the grid frequency. Generators that operate at a constant speed locked to the grid frequency are called synchronous generators.

Asynchronous generators operate at variable speeds and include a stator and rotor that are each controlled by a power converter. The power converters control electrical fields in the stator and rotor and adjust the fields to output a frequency that matches the grid frequency. As the speed of the generator changes, the power converters continually adjust the fields in the stator and rotor to match the grid frequency, so that the generator speed is not locked to the grid frequency.

One advantage of using asynchronous generators is realized when a gas turbine engine (engine) is used as a prime mover. When operating at maximum temperature, gas turbine engines increase mechanical power output when the speed of the gas turbine engine is increased. As the speed of the engine increases, the volume of air through the engine increases, and the engine may burn more fuel while respecting temperature limits, thereby producing more mechanical power. Using an asynchronous generator allows the gas turbine engine prime mover to operate at higher speeds than would a synchronous generator that is locked to the grid frequency.

While operating on a grid, if for example, other generators that supply power to the grid fail, the load on the generator will increase and the frequency of the grid may be reduced. Generators on the grid mitigate this frequency drop in two time frames. Because synchronous generators are locked to grid frequency, their speed will drop in response to the frequency depression. In the first fraction of a second, the energy stored in the inertia of synchronous machines is delivered to the grid as they slow down, and mitigates the rate of frequency decay, giving time for turbine controls to act to increase fuel. In the next several seconds the fuel increase in the turbine makes up for the generation deficit on the grid.

Introduction of asynchronous generators to the grid has the advantage of allowing more power from gas turbines by increasing their speed during a grid generation deficit, even though the grid frequency is depressed. However, the act of increasing speed draws power from the grid during the initial fraction of a second, to accelerate the inertia of the turgine-generator.

It is therefor the object of the present invention to define a strategy that accomplishes both an initial benefit to a grid disturbance by a speed reduction, and a longer-term benefit by a subsequent speed increase.

BRIEF DESCRIPTION OF THE INVENTION

An exemplary method for operating an asynchronous generator, the method comprising, receiving an indication that a power grid frequency is reduced, reducing a speed of the asynchronous generator from a first speed to a second speed for a first time period, responsive to the receiving the indication, wherein the reduction of the speed of the asynchronous generator results in a momentary increase in a total power output of the asynchronous generator, and increasing the speed of the asynchronous generator from the second speed to a third speed responsive to the end of the first time period.

An exemplary embodiment includes an electrical generating system comprising, a prime mover, an asynchronous generator, a processor operative to control the prime mover and asynchronous generator by, receiving an indication that a power grid frequency is reduced, reducing a speed of the asynchronous generator from a first speed to a second speed for a first time period, responsive to receiving the indication, wherein the reduction of the speed of the asynchronous generator results in a momentary increase in a total power output of the asynchronous generator, and increasing the speed of the asynchronous generator from the second speed to a third speed responsive to the end of the first time period.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

In the following detailed description, numerous specific details are set forth in order to provide a thorough understanding of various embodiments of the present invention. However, those skilled in the art will understand that embodiments of the present invention may be practiced without these specific details, that the present invention is not limited to the depicted embodiments, and that the present invention may be practiced in a variety of alternative embodiments. In other instances, well known methods, procedures, and components have not been described in detail.

Further, various operations may be described as multiple discrete steps performed in a manner that is helpful for understanding embodiments of the present invention. However, the order of description should not be construed as to imply that these operations need be performed in the order they are presented, or that they are even order dependent. Moreover, repeated usage of the phrase "in an embodiment" does not necessarily refer to the same embodiment, although it may. Lastly, the terms "comprising," "including," "having," and the like, as used in the present application, are intended to be synonymous unless otherwise indicated.

Electrical generators use a prime mover and a generator to produce electrical power. Synchronous generators operate at a speed that is locked to the grid frequency (e.g. 60 Hz). If a grid load increases, the synchronous generator increases the amount of fuel burned by the prime mover to increase the mechanical power output by the prime mover. The increase in mechanical power results in an increase in the electrical power output by the generator. However, the speed of the synchronous generator continues to correspond to the grid frequency.

Often when a critical event occurs on a grid, such as when a number of generators fail, the electrical load on the remaining generators increases. The increase in the load may result in the lowering of the grid frequency. Since the synchronous generator speed corresponds to the grid frequency, the generator speed will be reduced to output the lower grid frequency.

Asynchronous generators are not limited in speed by the frequency of the gird. If a load increases, and the frequency of the grid decreases, the speed of the generator may be increased. To increase the speed of the generator, the prime mover of the generator must accelerate the generator. The energy used to accelerate the generator results in a drop in the total power output by the generator during the acceleration. Since the drop in frequency may be a result of a critical event on the gird (i.e. the grid needs additional power from online generators), the drop in total power output by the generator during acceleration is undesirable, and may contribute negatively to the critical event.

Figure 1:
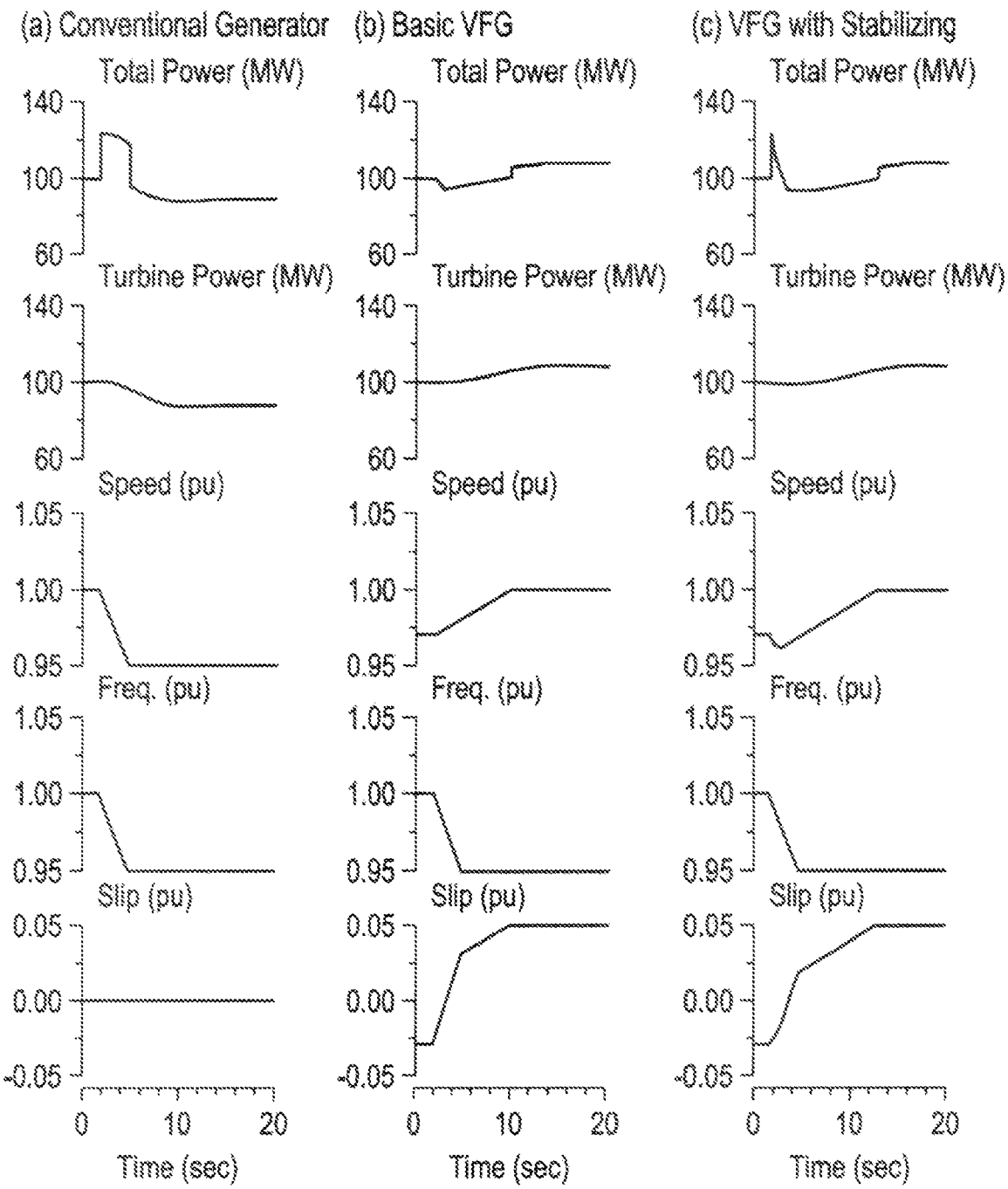
FIG. 1 is an example of operating characteristics of generators including an exemplary embodiment of operating characteristics of a variable speed generator.

FIG. 1 includes a number of operating characteristics of examples of generators during an example of a critical grid event. The left column of graphs labeled "(a) Conventional Generator" illustrates an example of a response of a synchronous generator to a reduction of a grid frequency. The center column of graphs labeled "(b) Basic VFG" illustrates an example of a response of a variable frequency generator (VFG) also called an asynchronous generator powered by a gas turbine engine prime mover. The right column titled "(c) VFG with stabilizing" includes graphs of a response of an exemplary embodiment of a VFG with grid stabilizing.

Referring to column (a), at a time 0 sec, the frequency of the synchronous generator is 1 pu. The speed of the generator is also 1 pu. The turbine power and total power output by the generator are 100 MW. Slip represents the difference between the generator speed and the frequency of the electrical output.

At approximately time 1 sec, the grid frequency (not shown) drops. The drop in the grid frequency may result after a critical event such as the failure of other generators that power the grid. The drop in grid frequency, results in the reduction in the frequency of the generator. Since the generator is a synchronous generator, the speed of the generator is also reduced to match the grid. As the speed of the generator is reduced, inertial energy in the generator is converted into electrical power, the conversion results in a momentary increase in the total electrical power sent to the grid to approximately 120 MW and a decrease in the mechanical power output by the turbine. The increase in total power sent to the grid occurs until approximately time 3 sec. The momentary increase in total power to the grid due to the slowing of the generator is desirable because the increase may result lowering the effect of the critical event on the grid. At approximately time 3 sec, the generator frequency and speed reaches a lower new grid frequency of 0.95 pu, the speed of the generator remains constant 0.95 pu. Since the speed of the synchronous generator must correspond to the grid frequency, the power output by the prime mover is limited by operating ratings of the prime mover. The total power output of the turbine remains below 100 MW.

Using a variable speed gas turbine as the prime mover of a generator allows the power output of the turbine to increase as the speed of the turbine increases. FIG. 1 includes a center column of graphs labeled "(b) Basic VFG" illustrates an example of the response of a variable frequency generator (VFG) also called an asynchronous generator powered by a gas turbine engine prime mover.

Referring to column (b) of FIG. 1, at a time 0 sec, the frequency of the asynchronous generator is 1 pu. The speed of the generator is approximately 0.97 pu. The turbine power and total power are 100 MW. The slip is constant at 0.03 pu. At approximately time 1 sec, the grid frequency (not shown) drops. Responsive to the drop in grid frequency, the turbine speed increases to deliver more power to the grid. As the speed of the turbine increases, more fuel may be burned by the turbine thereby increasing the turbine power. The increase in speed and turbine power requires more mechanical energy to be delivered to the generator to overcome the inertia of the generator and accelerate the generator speed. The increase in mechanical energy delivered to the generator results in a momentary loss of total power output by the generator. The loss of total power output during the acceleration of the generator is illustrated in the graph titled "Total Power (MW)" in column (b). Once the speed of the generator reaches 1 pu at approximately time 10 sec, the acceleration of the generator stops, and the speed remains constant. The resultant power from the turbine and the total power of the electrical generator remain constant above 100 MW. Though the resultant total power output by the generator after the drop in grid frequency is greater than 100 MW, the momentary loss of total power output at the beginning of the drop in frequency is undesirable because the grid may need more power immediately following a drop in grid frequency to maintain the stability of the grid.

Figure 2:
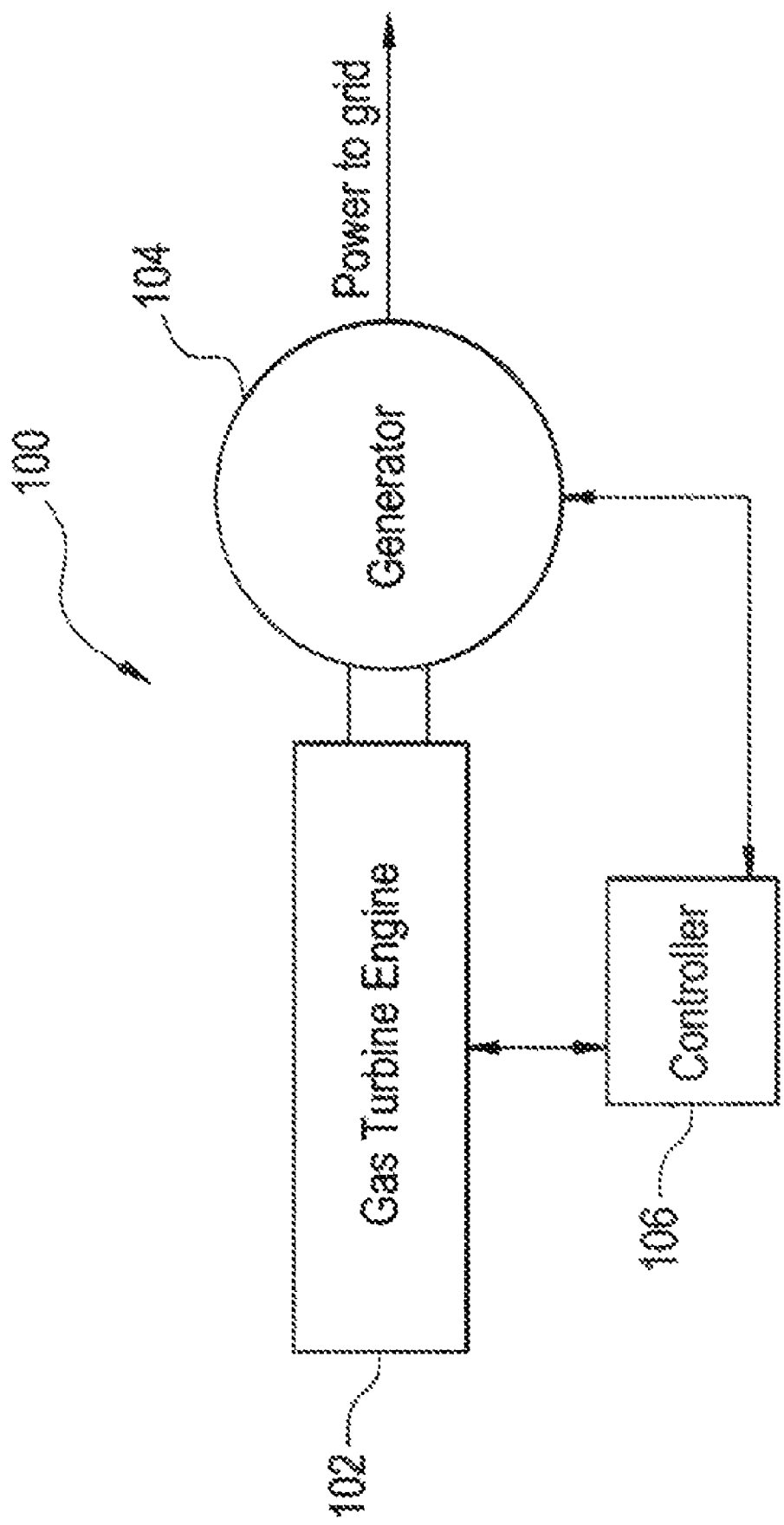
FIG. 2 is a block diagram of an exemplary system for generating electrical power.

FIG. 2 illustrates an exemplary embodiment of a variable speed electrical generation system 100 including a gas turbine engine (engine) 102 linked to an asynchronous generator 104 that outputs power to an electrical grid. A controller 106 is communicatively linked to gas turbine engine 102 and the asynchronous generator 104. The asynchronous generator 104 may also include an exciter (not shown) that may also be controlled by the controller 106.

The operation of an exemplary embodiment of the variable speed electrical generation system (system) 100 uses the controller 106 to control the operation of the engine 102 and the asynchronous generator 104. The operation of the system 100 during an example of a drop in the grid frequency (grid event) is illustrated in FIG. 1 in the right column titled "(c) VFG with stabilizing."

Referring to column (c) of FIG. 1, at a time 0 sec. the frequency of the asynchronous generator 104 is 1 pu. The speed of the asynchronous generator 104 is approximately 0.97 pu. The turbine power of the engine and total power output by the engine are 100 MW. The slip is constant at 0.03 pu. At approximately time 1 sec, the grid frequency (not shown) drops. Responsive to the drop in grid frequency, the controller 106 directs the engine 102 and the asynchronous generator 104 to reduce speed. The reduction in speed results in a momentary increase in the total power output by the asynchronous generator 104 due to the conversion of inertial energy in the asynchronous generator 104 into electrical energy. In the illustrated embodiment, the total power increases to approximately 120 MW at time 1 sec and is reduced to approximately 95 MW at time 2 sec.

At time 2 sec, the controller 106 increases the speed of the engine 102 and the asynchronous generator 104. At time 12 sec, the speed of the asynchronous generator 104 is 1.00 pu and remains constant, and resultant turbine power and total power remain above 100 MW.

Figure 3:
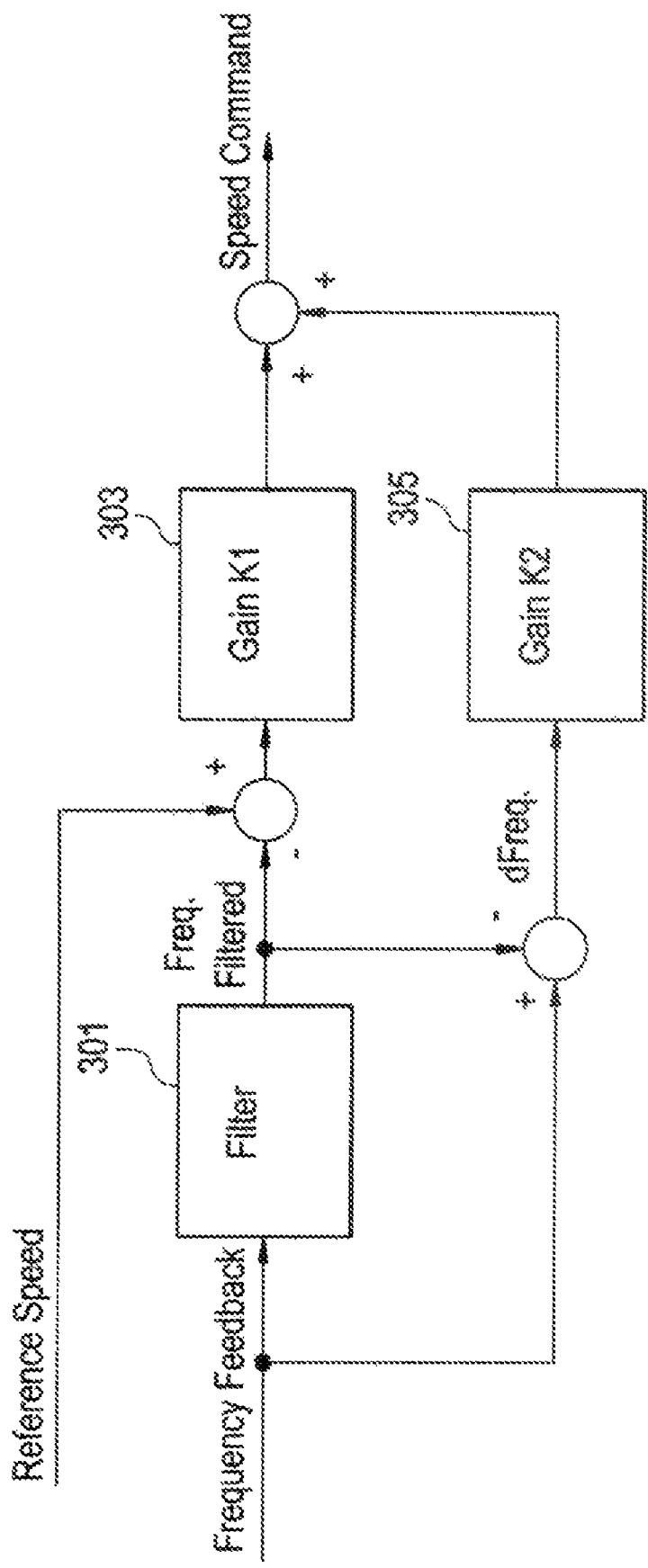
FIG. 3 is a block diagram of an exemplary method for generating electrical power.

FIG. 3 illustrates a block diagram of an exemplary embodiment of a control function that may be used to control the system 100 when the grid frequency suddenly drops. The function includes a filter 301 having a time constant, a gain K1 in block 303, and a gain K2 in block 305. The speed and frequencies in the function are in per unit of nominal where they each equal unity when the system 100 is running in sync with the grid and the grid is at the nominal frequency.

In operation, a frequency feedback signal from the grid is filtered by the filter 301. A filter time constant determines the duration of the temporary generator speed decrease in response to a sudden drop in the grid frequency. The filter 301 outputs a frequency filtered signal. The frequency filtered signal is subtracted from the frequency feedback signal resulting in a difference in frequency signal (dFreq). The dFreq signal is multiplied by the gain K2 in block 305. The gain K2 determines how much the generator speed decreases temporarily in response to the sudden drop in the grid frequency.

A reference speed signal is the desired speed of the generator when the grid is at nominal frequency and is in a steady state. The frequency filtered signal is subtracted from the reference speed signal and multiplied by the gain K1 in block 303. The gain K1 determines how much speed increases in proportion to a drop in the grid frequency. The output of the gain K1 and gain K2 blocks 303 and 305 are added to result in a speed command signal that may be sent to the controller 106 (in FIG. 1).

The operation of the system 100 incorporates the beneficial features of momentarily increasing the total power output by the asynchronous generator 104 responsive to a drop in grid frequency, and increasing the total power output once the speed of the engine 102 and asynchronous generator 104 are increased. The momentary increase in total power may contribute to grid stability by increasing the power on the grid at a critical time-during a drop in frequency. The system 100 further contributes to grid stability by operating at a higher speed and delivering more power to the grid once the frequency of the grid becomes constant.

This written description uses examples to disclose the invention, including the best mode, and also to practice the invention, including making and using any devices or systems and performing any incorporated methods. The patentable scope of the invention is defined by the claims, and may include other examples. Such other examples are intended to be within the scope of the claims if they have structural elements that do not differ from the literal language of the claims, or if they include equivalent structural elements with insubstantial differences from the literal languages of the claims.

What is claimed:

1. A method for operating an asynchronous generator, the method comprising:
   receiving an indication that a power grid frequency is reduced;
   reducing a speed of the asynchronous generator from a first speed to a second speed for a first time period, responsive to the receiving the indication, wherein the reduction of the speed of the asynchronous generator results in a momentary increase in a total power output of the asynchronous generator; and
   increasing the speed of the asynchronous generator from the second speed to a third speed responsive to the end of the first time period.

2. The method of claim 1, wherein the first time period is a function of the power grid frequency and a filter time constant.

3. The method of claim 1, wherein the second speed is a function of a filtered power grid frequency subtracted from the power grid frequency and multiplied by a first gain value.

4. The method of claim 1, wherein the third speed is a function of a filtered power grid frequency subtracted from a nominal generator speed and multiplied by a second gain value.

5. The method of claim 1, wherein the asynchronous generator is powered by a turbine engine.

6. An electrical generating system comprising:
   a prime mover;
   an asynchronous generator;
   a processor operative to control the prime mover and asynchronous generator by:
      receiving an indication that a power grid frequency is reduced;
   reducing a speed of the asynchronous generator from a first speed to a second speed for a first time period, responsive to receiving the indication, wherein the reduction of the speed of the asynchronous generator results in a momentary increase in a total power output of the asynchronous generator; and
   increasing the speed of the asynchronous generator from the second speed to a third speed responsive to the end of the first time period.

7. The system of claim 6, wherein the first time period is a function of the power grid frequency and a filter time constant.

8. The system of claim 6, wherein the second speed is a function of a filtered power grid frequency subtracted from the power grid frequency and multiplied by a first gain value.

9. The system of claim 6, wherein the third speed is a function of a filtered power grid frequency subtracted from a nominal generator speed and multiplied by a second gain value.

10. The system of claim 6, wherein the prime mover is a turbine engine.

11. A method for operating an asynchronous generator, the method comprising:
    receiving an indication that a power grid frequency is reduced;
    reducing a speed of the asynchronous generator from a first speed to a second speed for a first time period, responsive to the receiving the indication, wherein the reduction of the speed of the asynchronous generator results in a momentary increase in a total power output of the asynchronous generator, and the first time period is a function of the power grid frequency and a filter time constant; and
    increasing the speed of the asynchronous generator from the second speed to a third speed responsive to the end of the first time period.

12. The method of claim 11, wherein the second speed is a function of a filtered power grid frequency subtracted from the power grid frequency and multiplied by a first gain value.

13. The method of claim 11, wherein the third speed is a function of a filtered power grid frequency subtracted from a nominal generator speed and multiplied by a second gain value.

14. The method of claim 11, wherein the asynchronous generator is powered by a turbine engine.

15. An electrical generating system comprising:
    a prime mover;
    an asynchronous generator;
    a processor operative to control the prime mover and asynchronous generator by:
       receiving an indication that a power grid frequency is reduced;
    reducing a speed of the asynchronous generator from a first speed to a second speed for a first time period, responsive to receiving the indication, wherein the reduction of the speed of the asynchronous generator results in a momentary increase in a total power output of the asynchronous generator, and the first time period is a function of the power grid frequency and a filter time constant; and increasing the speed of the asynchronous generator from the second speed to a third speed responsive to the end of the first time period.

16. The system of claim 15, wherein the second speed is a function of a filtered power grid frequency subtracted from the power grid frequency and multiplied by a first gain value.

17. The system of claim 15, wherein the third speed is a function of a filtered power grid frequency subtracted from a nominal generator speed and multiplied by a second gain value.

18. The system of claim 15, wherein the prime mover is a turbine engine.

* * * * *